United States Patent
Feng et al.

(10) Patent No.: US 11,055,139 B2
(45) Date of Patent: Jul. 6, 2021

(54) SMART ACCELERATOR ALLOCATION AND RECLAMATION FOR DEEP LEARNING JOBS IN A COMPUTING CLUSTER

(71) Applicant: INTERNATIONAL BUSINESS MACHINES CORPORATION, Armonk, NY (US)

(72) Inventors: Kuan Feng, Thornhill (CA); Junfeng Liu, Markham (CA); Zhichao Su, Beijing (CN); King Shing K. Lui, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 16/006,339

(22) Filed: Jun. 12, 2018

(65) Prior Publication Data
US 2019/0377606 A1   Dec. 12, 2019

(51) Int. Cl.
G06F 9/46       (2006.01)
G06F 9/50       (2006.01)
G06N 20/00      (2019.01)

(52) U.S. Cl.
CPC .......... *G06F 9/5011* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,540,588 B2 * | 1/2020 | Burger | G06N 3/063 |
| 2017/0220949 A1 | 8/2017 | Feng et al. | |
| 2019/0121414 A1 * | 4/2019 | Eastep | G06F 9/5094 |
| 2019/0312772 A1 * | 10/2019 | Zhao | G06F 9/5011 |
| 2019/0370086 A1 * | 12/2019 | Heilper | G06N 3/063 |

OTHER PUBLICATIONS

Bhattacharjee et al. "IBM deep learning service", IBM J. Res. & Dev., vol. 61 No. 4-5, Paper 10, Jul./Sep. 2017. pp. 1-11. (Year: 2017).*
Park et al., "Scale-Out Acceleration for Machine Learning," Proceedings of the 50th Annual IEEE/ACM International Symposium on Microarchitecture, ACM 2017 (15 pages).
Anonymous, "Methods for Deep Learning Network Compression for Resource-constrained Devices," An IP.com Prior Art Database Technical Disclosure, IP.com No. IPCOM000246620D, Jun. 21, 2016 (5 pages).

* cited by examiner

*Primary Examiner* — Kenneth Tang
(74) *Attorney, Agent, or Firm* — Griffiths & Seaton PLLC

(57) ABSTRACT

Embodiments for accelerator allocation and reclamation for deep learning jobs in a computing cluster. Metrics are recorded of each accelerator of a set of accelerators allocated to a deep learning job including computing a gain of computational power by an additional allocation of new accelerators and computing a cost of transferring data among the new accelerators and the set of allocated accelerators. Ones of the new accelerators are allocated to the deep learning job or ones of the set of allocated accelerators assigned to perform the deep learning job are reclaimed upon determining an optimal accelerator topology by comparing the gain of computation power and the cost of transferring data.

18 Claims, 10 Drawing Sheets

SMART ACCELERATOR ALLOCATION AND RECLAMATION FOR DEEP LEARNING JOBS IN A COMPUTING CLUSTER

BACKGROUND OF THE INVENTION

Field of the Invention

The present invention relates in general to computing systems, and more particularly, to various embodiments for allocating and reclaiming accelerators for performing deep learning jobs in distributed computing environments.

Description of the Related Art

In today's interconnected and complex society, computers and computer-driven equipment are more commonplace. When performing compute-intensive workloads such as data analytics, an effective framework involves distributed parallel computing, which operates to disperse processing tasks across multiple processors operating on one or more computing devices such that parallel processing may be executed simultaneously. One example of parallel computing involves deep learning. Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics.

SUMMARY OF THE INVENTION

Various embodiments for accelerator allocation and reclamation for deep learning jobs in a computing cluster are provided. In one embodiment, metrics are recorded of each accelerator of a set of accelerators allocated to a deep learning job including computing a gain of computational power by an additional allocation of new accelerators and computing a cost of transferring data among the new accelerators and the set of allocated accelerators. Subsequent to recording the metrics, ones of the new accelerators are allocated to the deep learning job or ones of the set of allocated accelerators assigned to perform the deep learning job are reclaimed upon determining an optimal accelerator topology by comparing the gain of computation power and the cost of transferring data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
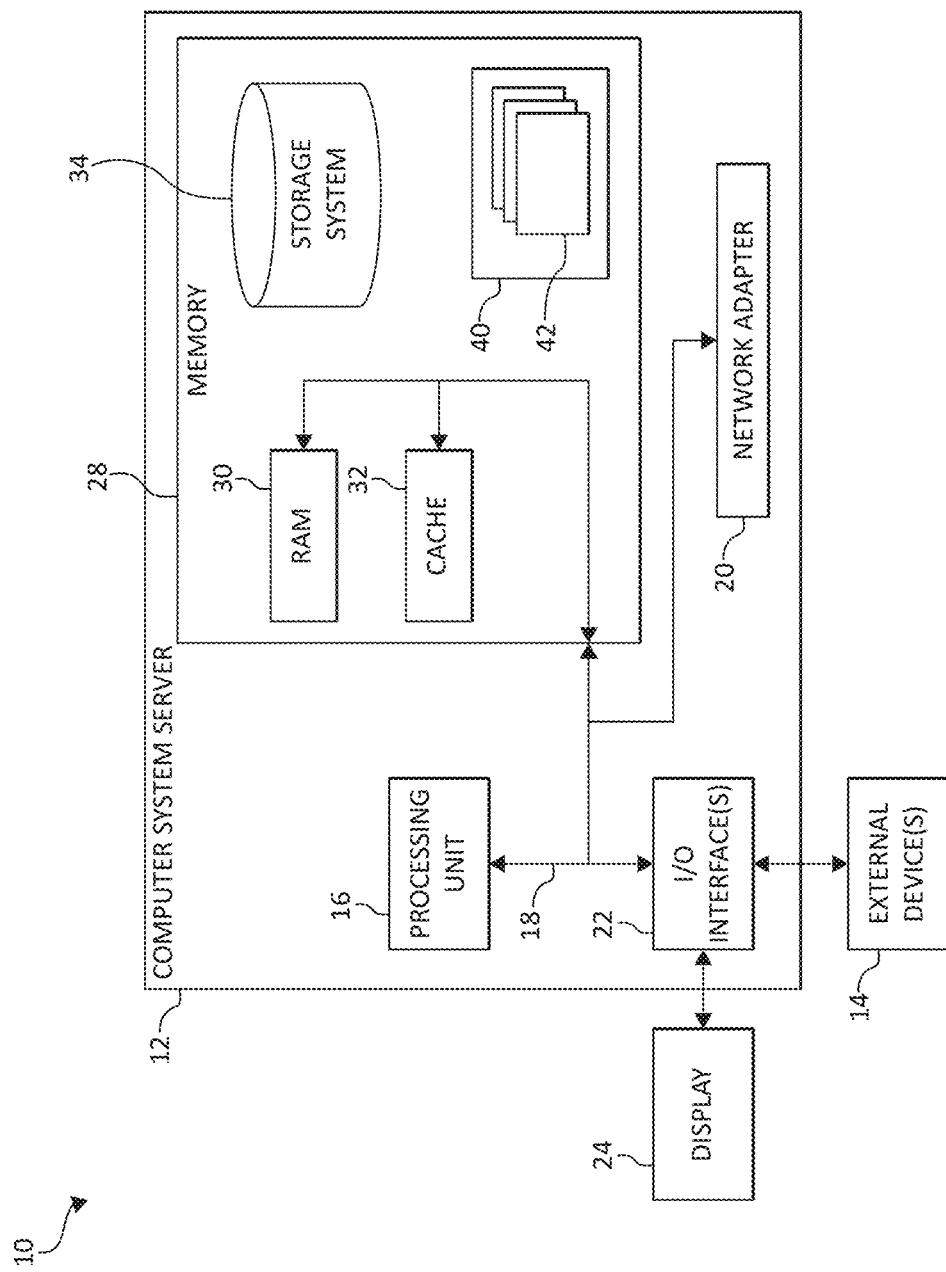
FIG. 1 is a block diagram depicting an exemplary computing node according, to embodiments of the present invention.

As aforementioned, when performing compute-intensive workloads such as data analytics and deep learning, an effective framework involves distributed parallel computing, which operates to disperse processing tasks across multiple processors (or preferably hardware accelerators) operating on one or more computing devices such that parallel processing may be executed simultaneously.

Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics. Data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages. During a processing stage, learner units can independently generate data based on input data and/or previously learned data and such information can be gathered by a centralized entity or otherwise passed on to a global model for distribution to the other learners. However, a centralized approach for deep learning often suffers from communication delays, network bottlenecks and/or an imbalance in bandwidth and/or hardware utilization. Further, job scheduling in the cluster must be accurately performed to ensure that any one of the cluster nodes is underutilized or overutilized at a given time, which can inherently lead to poor job efficiency. Moreover, when considering the scheduling and utilization of processors or accelerators when performing deep learning jobs, sometimes contrary to simple intuition, the additional allocation of processors or accelerators to the deep learning job may at some point actually reduce overall performance of the job. This is because the distribution cost of the data of the deep learning job among a larger set of processors or accelerators may at some point become greater than merely allowing a smaller set of processors or accelerators to process the deep learning job with a narrower data distribution, even though fewer processors or accelerators have been allocated to the job. To wit, sometimes a deep learning job may actually benefit performance-wise by reclaiming (removing) one or more allocated processors or accelerators which are executing the job, such that the cost of performing the job on fewer resources outweighs the cost of distributing the data thereof among a greater number of the resources which were previously allocated thereto.

Accordingly, the present invention introduces novel techniques for increasing the efficiency of job scheduling and performance by the allocation and reclamation of accelerators (i.e., graphical processing units (GPUs) or field-programmable gate arrays (FPGAs), etc.) performing deep learning jobs in the clustered environment. These techniques include computing a gain of computational power which would be achieved by allocating additional available accelerators to the deep learning job, and comparing the gain of computational power to a cost of synchronizing the job data among the additional available accelerators which could be allocated. Further, this functionality provides efficient techniques for reclaiming accelerator(s) from a job when it is determined that reclaiming the accelerator(s) would likely increase performance when running the job. As will be discussed, following, when employing these mechanisms on each job running within the cluster, the overall utilization of accelerators in the cluster is improved while simultaneously improving the performance of each respective job execution.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
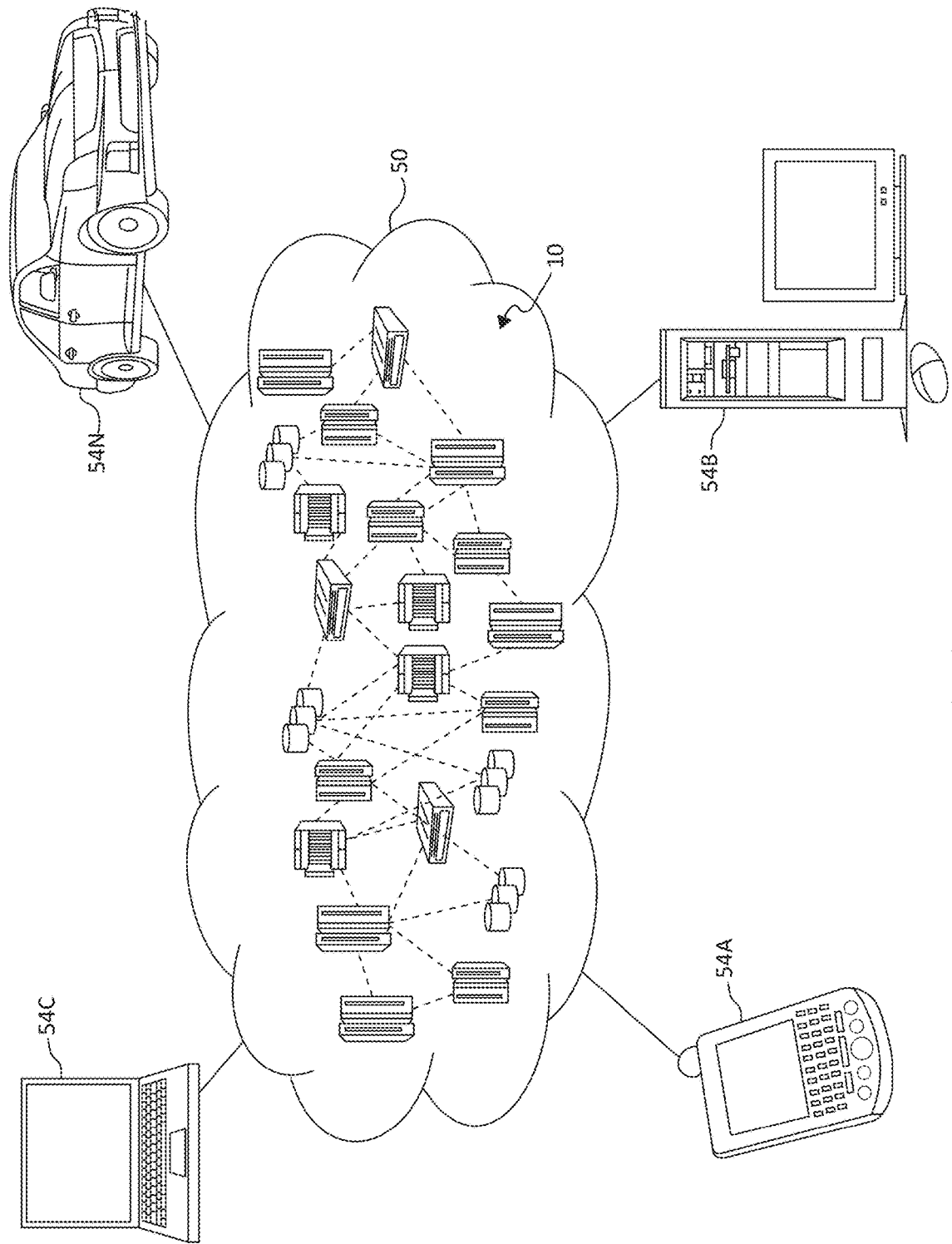
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
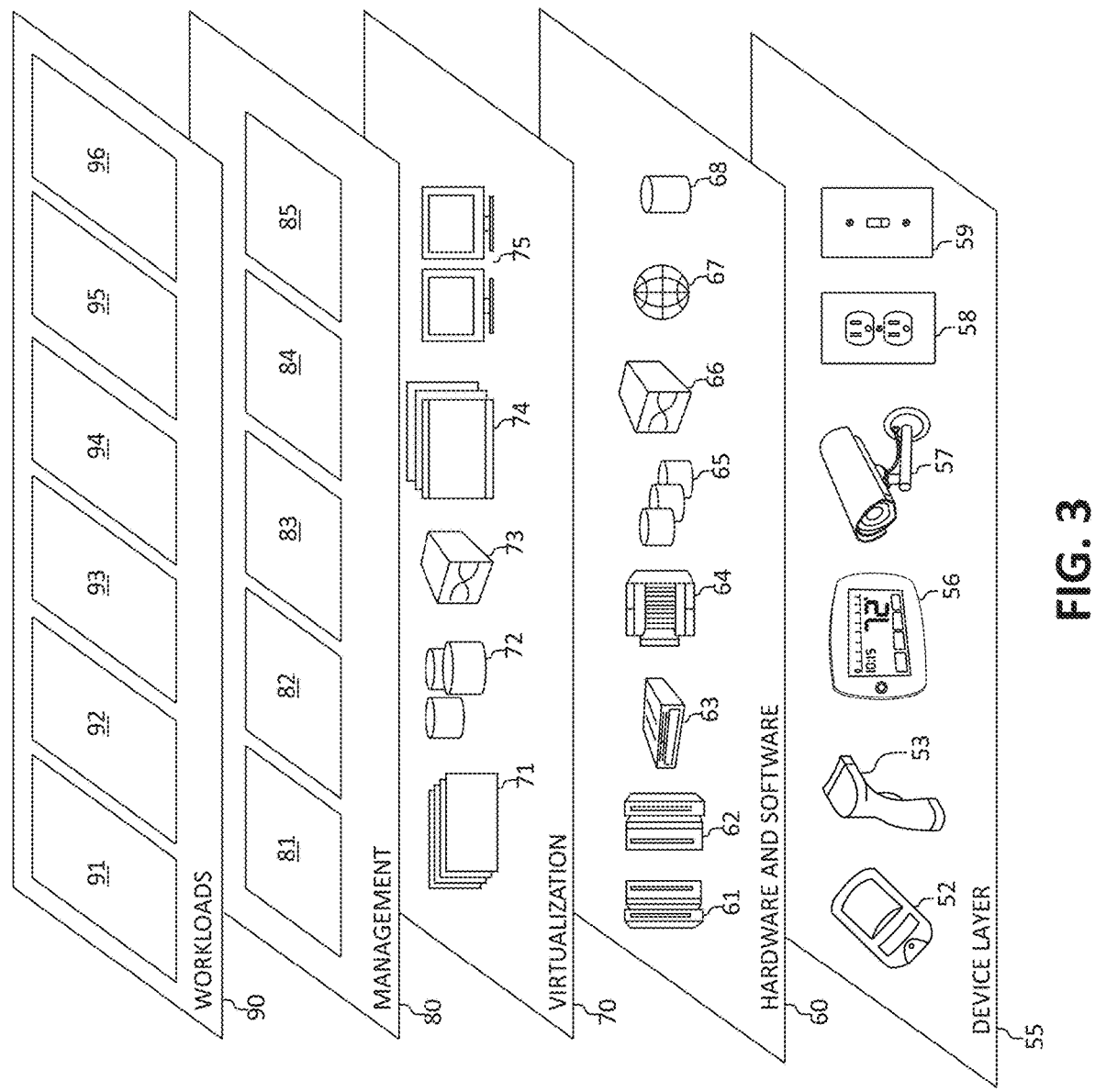
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, hand-held scanner 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning and large-scale data processing workloads and functions 96.

Smart Accelerator Allocation and Reclamation

Embodiments described herein include techniques facilitating the allocation, reclamation, and synchronization of processing components (e.g., accelerators) for parallel deep learning in distributed systems. As mentioned and as a general overview, data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages. Processing components can utilize this training and can each receive a set of inputs to therefore collectively generate an output based on the set of inputs.

Generally, an output generated by a processing component can be provided to all other processing components in a designated group of processing components. In some implementations, the processing components in a particular group can change from time to time during the deep learning process and based on any number of different factors. Accordingly, collaborative groups of processing components can be dynamically synchronized for parallel learning. In an aspect, model weights for a deep learning system can be communicated amongst a subset of processing components (e.g., a set of parallel processing components). In some embodiments, communication between the one or more processing components can occur after the processing components in the subset complete a training process over a particular interval (e.g., over a defined mini-batch size, etc.).

Figure 4:
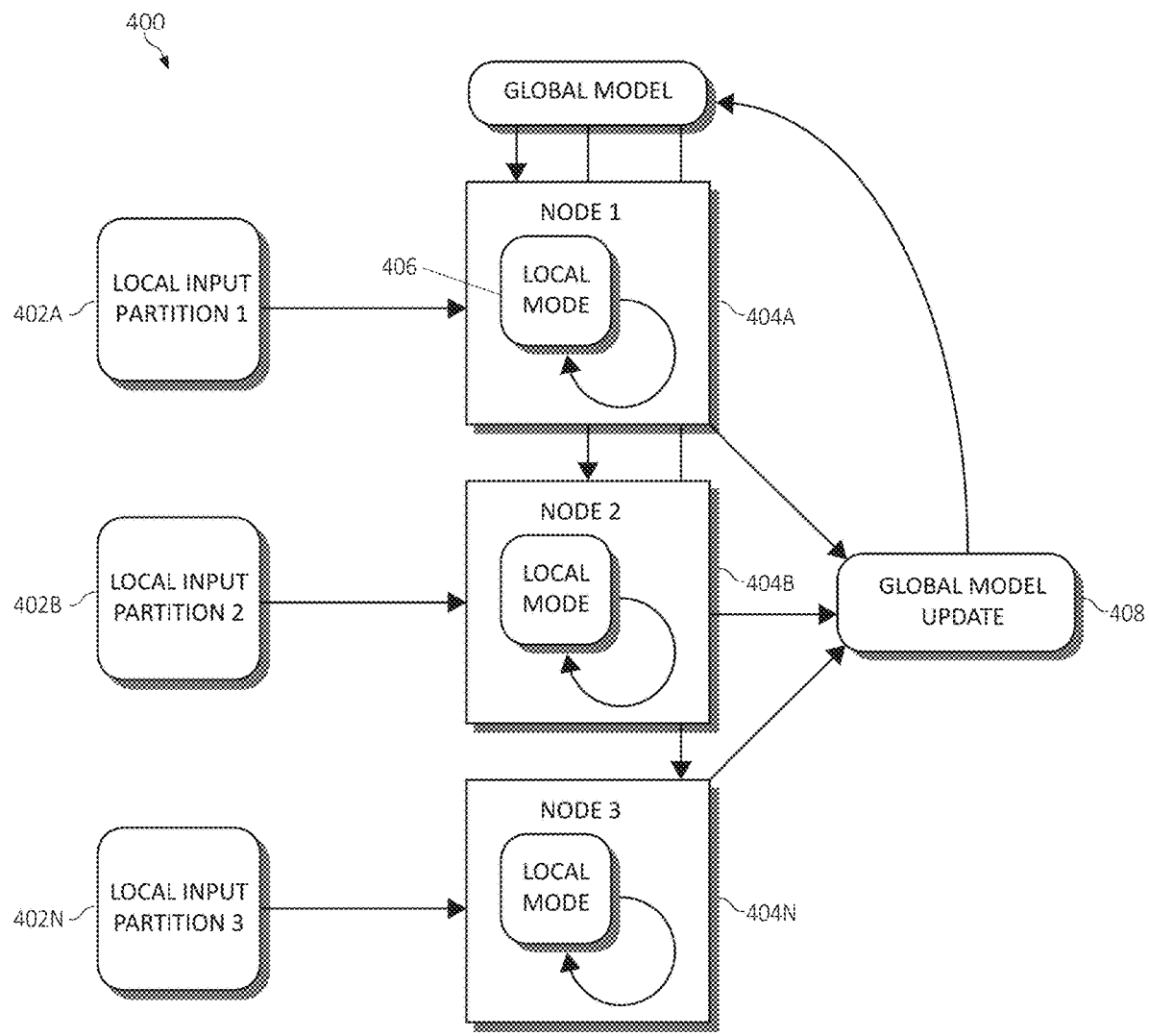
FIG. 4 is a block diagram depicting a distributed training architecture for training learner nodes, in accordance with aspects of the present invention.

Learning or "training" associated with the deep learning process can occur by selecting different subsets of processing components at different times during the deep learning process. Referencing FIG. 4 now, as illustrated in the distributed training architecture 400 for training learner nodes, local input partitions: 402A-n are used on nodes 404A-n to compute a local model 406. This local model 406 is then used to update a global model 408, which is synchronized across all nodes 404A-n. Each node 404A-n repeats an iterative training algorithm wherein the respective node loads training data, calculates gradients based on the global model 408, aggregates and updates the global model 408 from the local mode 406, and synchronizes a last computed model among all the nodes 404A-n. Of note, each node 404A-n performs an identical learning task, training, and synchronization to update the model for all nodes 404A-n. The cost (in terms of resources needed such as processing components, network components, etc.) for performing this synchronization is often significant and can affect performance.

The underlying issue with the training system as described, is that the training system experiences efficiency effects caused by GPU resource utilization (both at a local level and a cluster level) and the aforementioned synchronization cost. The synchronization cost is factored heavily on the topology of the cluster. For example, in a VGG model having a 128.3 M model (batch) size per GPU, four GPUs equates to 1026 M data for synchronization. Now considering that generally GPU communication topology has a GPU-GPU throughput of 200 G/s, an NVLink throughput of 80 G/s, an Infiniband throughput of 100 G/s, and an Ethernet throughput of 10 G/s, it is recognizable that a bottleneck is found in the most-limited link (the slowest transmission medium) between the nodes 404A-n.

Figure 5:
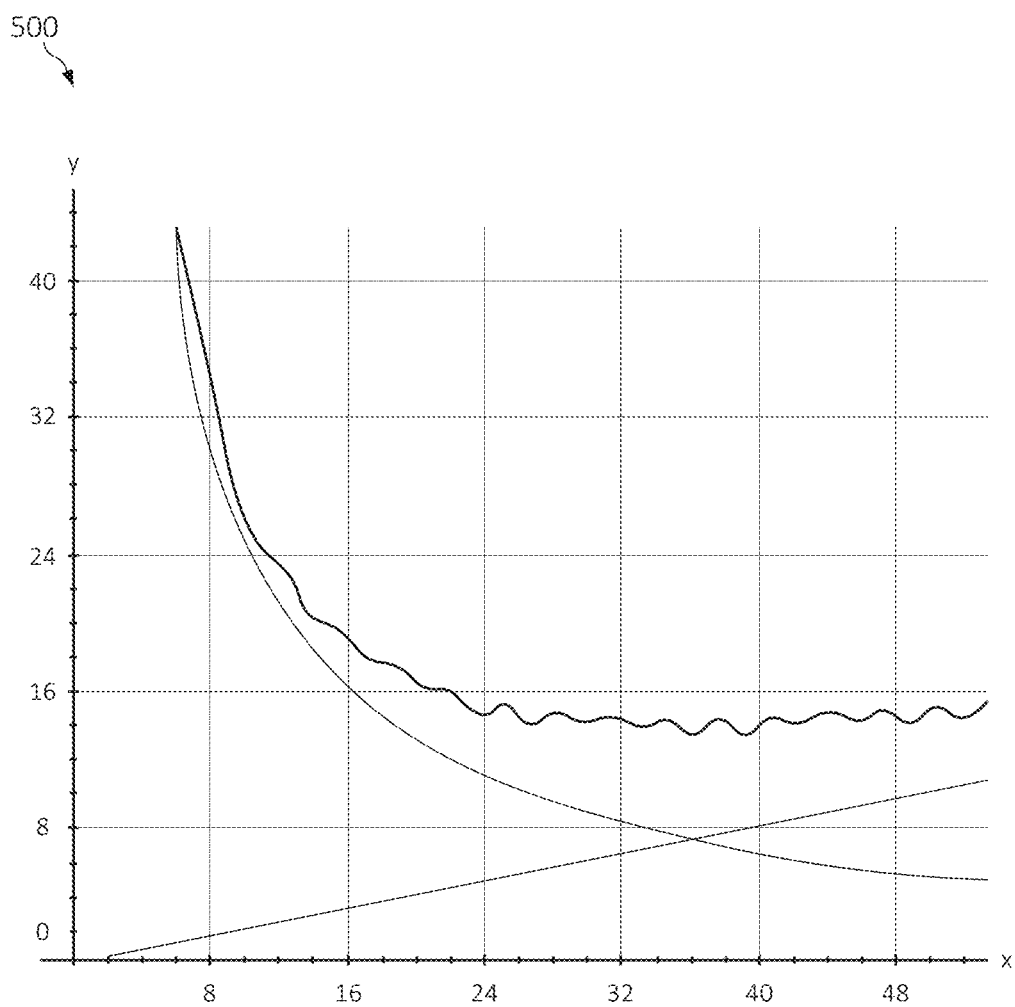
FIG. 5 is a graph diagram depicting a performance of a deep learning job over a certain time period, in accordance with aspects of the present invention.

Moreover, in a multiple application/tenant scenario, the GPU of a job may be scattered among several hosts which results in even lower efficiency. Therefore, the job scheduler must have awareness of both the workload of the jobs and the topology of the cluster to accurately schedule jobs to achieve a high resource utilization while providing a most efficient workload production environment as possible. Still further, as aforementioned, when considering the scheduling, synchronization, and utilization of accelerators when performing deep learning jobs, the additional allocation of accelerators to the deep learning job may at some point actually reduce overall performance of the job. For example, and as depicted in the graph diagram 500 of FIG. 5, adding (allocating) a first accelerator of a host may bring little value to the deep learning job, and adding additional accelerators of an exiting host (having completed a former deep learning job) to the deep learning may bring more value over time, however, there's a point where adding additional accelerators to the job does not bring any additional value, and as aforementioned, may actually hinder performance. Indeed, in some cases, reclaiming accelerators from the deep learning job (i.e., removing the last accelerator of a host) may actually increase performance. Referencing diagram 500, it can be seen that the additional allocation of accelerators to the job (x-axis) begins to waver and stagnate any performance over the overall job execution time (y-axis). Some prior art implementations exist which use a fixed number of GPUs and a fixed batch size, and attempt to schedule jobs based on a batch size configuration and resource policy, however, these implementations are heavily reliant on user expertise to adjust parameters of the system to achieve optimal results.

Accordingly, the mechanisms of the present invention, again, leverage training metrics and topology information to determine when and when not to accept accelerator allocations for performing a deep learning job by computing a gain of computational power which would be achieved by allocating additional available accelerators to the deep learning job, and comparing the gain of computational power to a cost of synchronizing the job data among the additional available accelerators which could be allocated. Further, this functionality provides efficient techniques for reclaiming accelerator(s) from a job when it is determined that reclaiming the accelerator(s) would likely increase performance when running the job.

Figure 6:
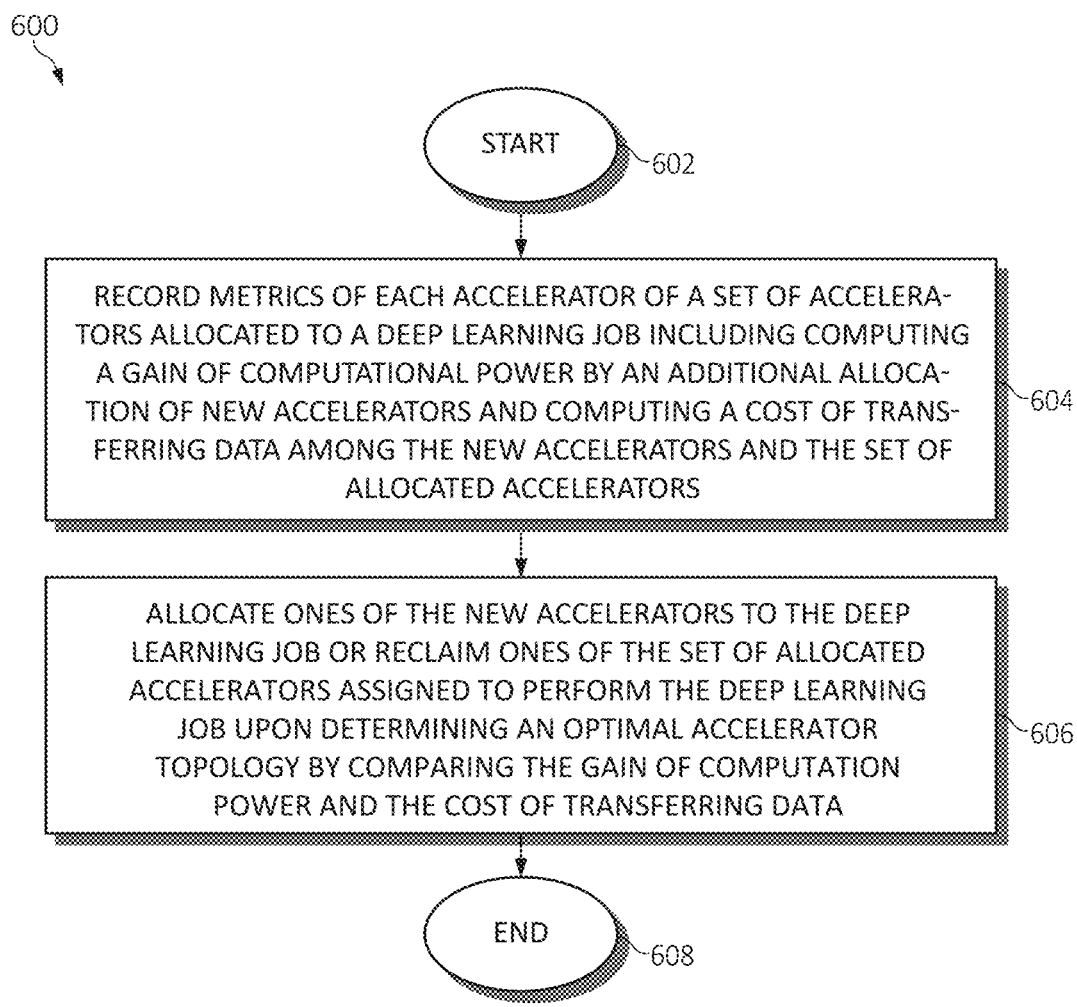
FIG. 6 is a flowchart diagram of an exemplary method for accelerator allocation and reclamation for deep learning jobs, in accordance with aspects of the present invention.

Forming an overview of this functionality, FIG. 6 is a flowchart diagram of an exemplary method 600 for accelerator allocation and reclamation for deep learning jobs in a computing cluster. Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 600 begins (step 602) by recording metrics of each accelerator of a set of accelerators allocated to a deep learning job including computing a gain of computational power by an additional allocation of new accelerators and computing a cost of transferring data among the new accelerators and the set of allocated accelerators (step 604). Subsequent to recording the metrics, ones of the new accelerators are allocated to the deep learning job or ones of the set of allocated accelerators assigned to perform the deep learning job are reclaimed upon determining an optimal accelerator topology by comparing the gain of computation power and the cost of transferring data (step 606). The method 600 ends (step 608).

In some embodiments, the mechanisms of the present invention use the following three components to implement the various disclosed functionality: (a) A Metrics Collector to collect runtime information associated with each deep learning job; (b) A Cost Calculator to evaluate the performance impact of topology changes of the accelerators within the cluster; and (c) A Decision Maker to identify and implement an actual plan to allocate and/or reclaim accelerators from respective deep learning jobs to gain an optimal accelerator topology across the cluster. It should be noted that components within the disclosure may be implemented within a session scheduler which schedules resource allocations to each deep learning job, inside the deep learning job itself (i.e., within the scheduler client), or a combination thereof. For example, the computations as discussed herein may be performed within the deep learning job itself, which then may send hints to the session scheduler as to the pre-screening of resource scheduling for the instant and/or future jobs.

Metrics Collector

In various embodiments, metrics are recorded including the computation power of each accelerator in the cluster. This computation power (C) may be defined as $C=T/B$, where T is the duration of calculation of each accelerator in each job iteration and B is data (i.e., the number of batches) calculated on each accelerator during each iteration. In other words, the computation power is essentially a duration of time it takes a given accelerator to calculate a given number of data batches. It should be noted that, generally, all accelerators substantially share the same C metric.

Further recorded is a synchronization cost of data among each of the accelerators (i.e., the cost of synchronizing batch data across each accelerator performing the deep learning job). The synchronization cost may be defined as a duration of time of synchronization of each accelerator to each other accelerator in each iteration. The synchronization cost may include an in-host cost (i.e., accelerators within the same cluster host—which generally share the same performance), a cross-hosts cost (i.e., accelerators within differing hosts—which generally share the same inter-host synchronization cost), and a cross-group cost (i.e., accelerators in differing hosts within a certain table or group). Moreover, the recorded metrics also identify and keep a record of a job-active host list, where all active hosts pertaining to a certain deep learning job are listed. It should be further noted that, proceeding with the disclosed functionality, the host information in an all-host list is continued to be kept even if an accelerator belonging to a host on the job-active host list is reclaimed.

Cost Calculator

In various embodiments, a job cost is calculated for a remaining time period of the deep learning job. This may comprise a computation cost of the job with n accelerators (which may be expressed as $N/(C*n)$) and the synchronization cost across the n accelerators. When considering the synchronization cost, it is important to note that the accelerator topology (i.e., how the accelerators are distributed throughout the hosts/cluster, as discussed previously) is essential to determining the cost. For example, if 8 GPUs are scattered among 2 hosts, the synchronization cost may be calculated as: 6*in-host cost+1*cross-host cost. In another example, if 8 GPUs are scattered among 4 hosts, the synchronization cost may be calculated as: 4*in-host cost+3*cross-host cost.

Figure 7:
FIG. 7 is a block diagram depicting a distribution of a gradient array during the calculation of synchronization costs, in accordance with aspects of the present invention.

FIG. 7 is a block diagram depicting a distribution of a gradient array 700 during the calculation of synchronization costs across the depicted GPUs 1-4. To calculate the synchronization cost, the gradient array 700 is divided at each GPU into four (N GPU parts), which may be represented as: [w1, . . . , w4] [w2, . . . , w4] [w3, . . . , w4] [w4, . . . , w4]. At each step, each i-th GPU sends ¼ of its gradient array to GPU (i) mod 4+1 (GPU 1→GPU2; GPU 2→GPU3; GPU 3→GPU4; and GPU 4→GPU1).

At step 1 (block 702), i-th GPU sends its i-th part of the gradient array. At step 2 (block 704), each i-th GPU sends its part (i−2) mod 4+1 of the gradient array (such that a 1st part is distributed to GPU 4; 2nd part is distributed to GPU 1; 3rd part is distributed to GPU 2; and 4th part is distributed to GPU 3). At step 3 (block 706), each i-th GPU sends its part (i−3) mod 4+1 of the gradient array (such that a 1st part is distributed to GPU 3; 2nd part distributed to GPU 4; 3rd part distributed to GPU 1; and 4th part distributed to GPU 2). It is noted that after N−1 steps, all gradients are computed and distributed among N GPUs (as in the final gradient distribution in block 708), and a total time of gradient distribution is computed comprising the synchronization cost.

In some embodiments, a predicted job cost may be determined for a certain accelerator profile. While the computation cost is straightforward using the formula discussed previously, the synchronization cost wholly depends on the location of the new accelerator (an available accelerator which could be allocated to the job). For example, the synchronization cost for the new accelerator may differ widely based upon whether the accelerator is within an existing host, in a new host in an existing host group, or a new host group.

With the foregoing in mind, the goal is to attempt to locate a "ceiling" or "optimized" topology of a respective cluster host for each case (with regard to the respective deep learning job and the location of the accelerator(s)). The optimized topology for the respective host comprises the topology which produces the least job cost. That is, the optimized topology comprises the topology (the distribution of accelerators among hosts in relation to the deep learning job) which results in a gain of new computational power achieved by the addition of new (available for allocation) accelerator(s) being less than the cost of synchronizing this accelerator to the existing accelerators performing the job.

Figure 8:
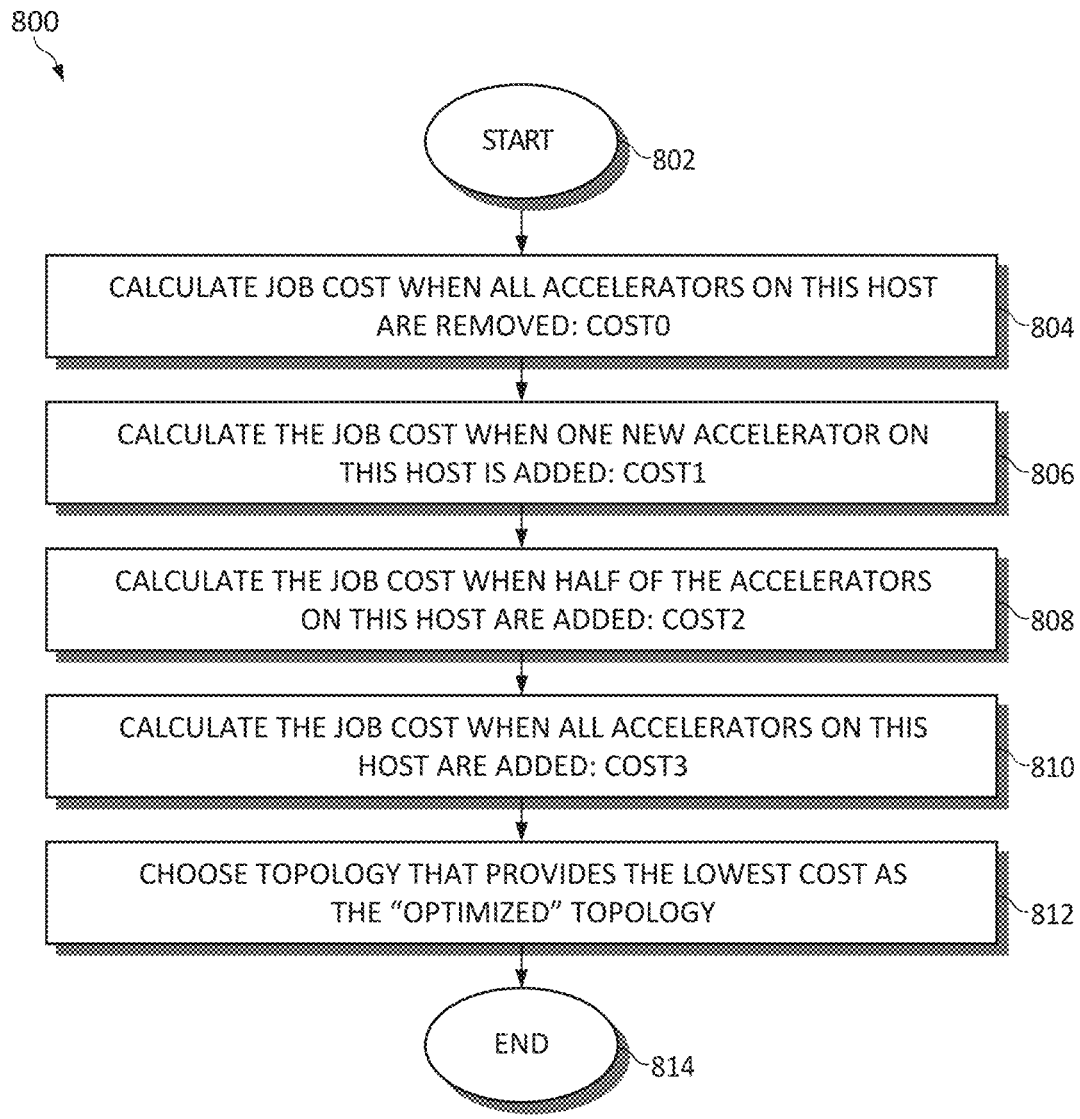
FIG. 8 is a flowchart diagram of an exemplary method for computing an optimal accelerator topology, in accordance with aspects of the present invention.

FIG. 8 illustrates a flowchart diagram of an exemplary method 800 for computing the optimal accelerator topology for each respective cluster host using the aforementioned comparison between the gain of computational power and the synchronization cost of the deep learning job. The method 700 references a single host, however this process may be performed for each host in the cluster with regard to a respective deep learning job. Beginning (step 802), the job cost is computed according to the prescribed formula when all accelerators on the host are removed, and this job cost may be expressed as "cost0" (step 804). Next, the job cost is similarly computed when one new accelerator on the host is added (allocated), and this job cost may be expressed as "cost1" (step 806). The job cost is then computed when half of all accelerators (half of the number of all accelerators) are added, and this job cost may be expressed as "cost2" (step 808). Finally, the job cost is computed when all accelerators on the host are added, and this job cost may be expressed as "cost3" (step 810). Subsequently to performing the previous three computations, the topology providing the lowest overall job cost (computation cost when compared with synchronization cost) is selected as the optimized topology (step 812). The method 800 ends (step 814).

Decision Maker

Figure 9:
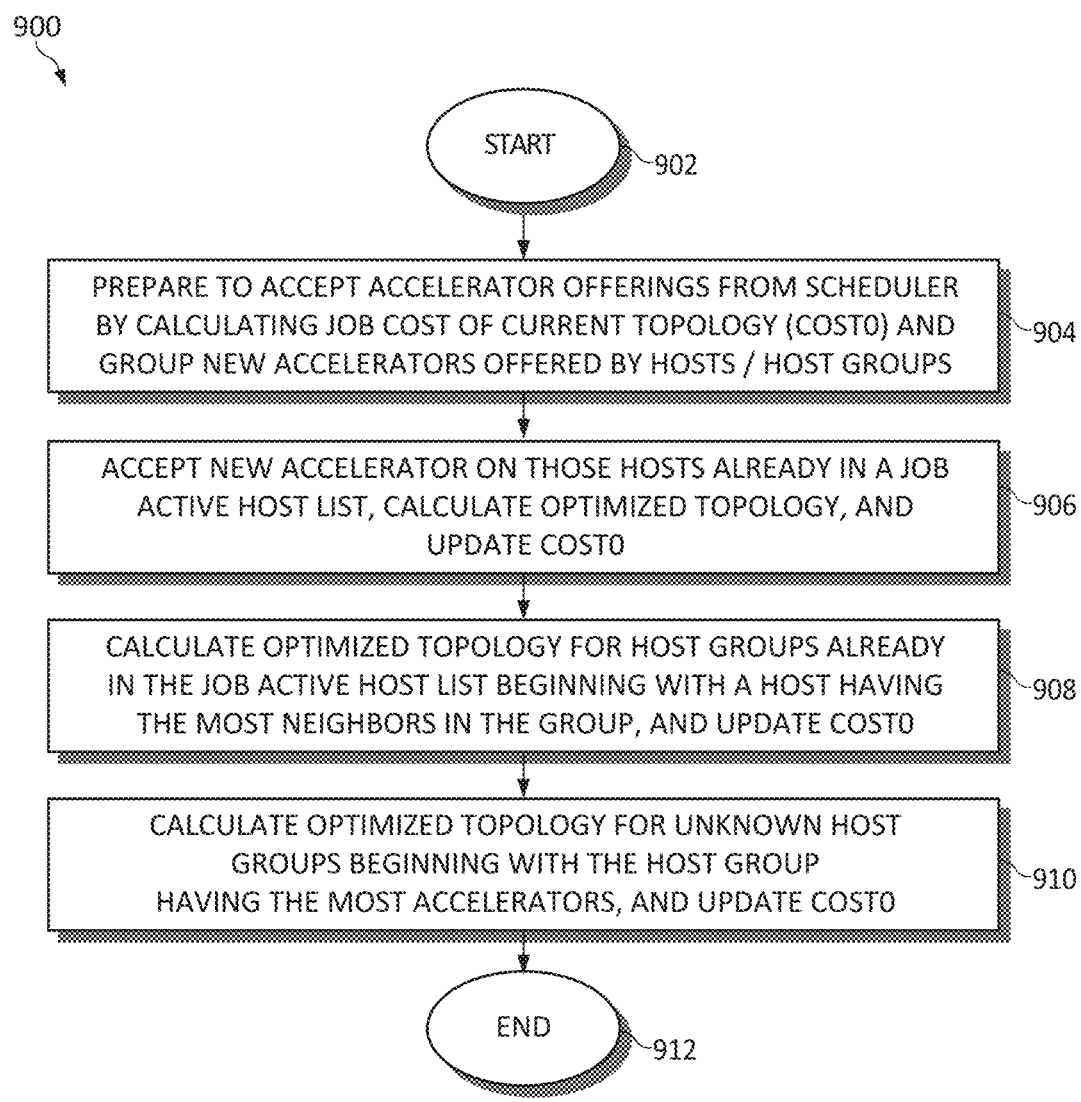
FIG. 9 is a flowchart diagram of an exemplary method for accepting allocation of accelerators for a deep learning job, in accordance with aspects of the present invention.

Subsequent to recording the computational power and synchronization metrics, and computing the overall job and synchronization costs, the decision maker may then determine which accelerators to accept (allocate) and which accelerators to remove (reclaim) from a given host and/or deep learning job. In some embodiments, when receiving a new accelerator offering from the session scheduler, the following procedure is performed pursuant to allocating the accelerators to the given cluster host/deep learning job, as illustrated in method 900 of FIG. 9.

The method 900 begins (step 902) by preparing to accept the accelerator offering from the scheduler (step 904). This preparation includes calculating the job cost of the current topology (cost0), grouping new accelerators offered by hosts, and grouping new accelerator hosts by (known) host groups. In this step, unknown hosts are treated as a new host group. It should be noted that a user may contribute or define rules within the system as to which hosts are comprised within a given host group.

Subsequent to the computation of the current topology and the grouping of accelerators and hosts by host groups, in a first step, an (offered) available accelerator(s) is/are accepted on those hosts currently in the job-active host list (step 906). This is performed by, beginning with accelerator (s) whose host has the highest number of accelerators existing in the current job-active host list, calculating the optimized (or "ceiling") topology of new hosts, and accepting the offered accelerator(s) according to the outcome of the topology calculation. Cost0 is then updated with the new (optimized) topology, and the method 900 returns to calculating the optimized topology on the host having the next-highest number of accelerators existing in the current job-active host list, until all hosts with new accelerators have been checked.

In a second step, the optimized topology for host groups currently in the job-active host list is then checked (step 908) by starting with the host having the highest number of neighboring hosts in the same host group, calculating the optimized (ceiling) topology of the host and accepting those accelerators based on the outcome of the topology calculation. Again, cost0 is updated according to the new (optimized) topology, and the topology is then continued to be identified for the host having the next-highest number of neighbors in the same host group, until all hosts have been tried.

Finally, in a third step, unknown host groups are then checked (step 910). Starting with the host group having the most accelerators and starting with the host with the most accelerators in that host group, the optimized (ceiling) topology is computed of the host, and those accelerators are then accepted according to the outcome of the topology calculation. Cost0 is then updated with the new topology and the host having the next-highest number of accelerators is then determined and the topology thereof calculated until all hosts in the particular host group have been checked. Once all hosts in the particular host group have been identified and checked, a next host group having a next-highest number of accelerators is then identified and the topology thereof computed, and the method 900 continues in this manner until all hosts and host groups have been checked. The method 900 may end, as in block 912.

Figure 10:
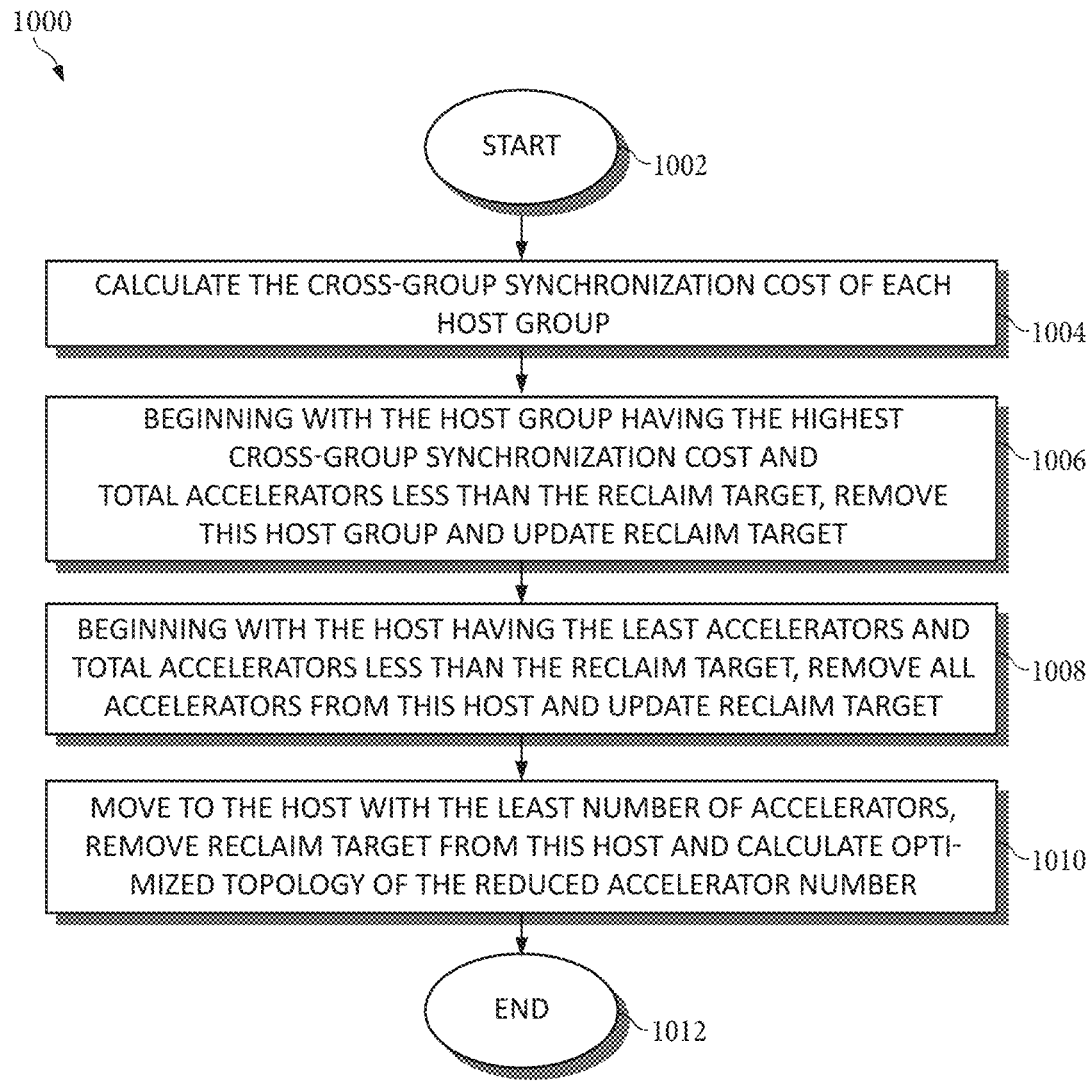
FIG. 10 is a flowchart diagram of an exemplary method for reclaiming accelerators from the deep learning job, in accordance with aspects of the present invention.

As previously mentioned, in some cases, when computing the optimized topology, it may be identified that the deep learning job/host may actually perform more efficiently were accelerators to be reclaimed (removed) from this deep learning job/host. FIG. 10 illustrates a method 1000 for performing this reclamation as follows.

The method 1000 begins (step 1002) by preparing to reclaim accelerators by grouping current accelerators according to hosts and host groups. Next, in a first step, the cross-group synchronization cost is calculated of each host group (step 1004), where the sum of the cross-group synchronization cost includes all members within the given host group. In a second step, beginning with the host group having the highest cross-group synchronization cost and a total number of accelerators which is less than the reclamation target (host), this identified entire host group is removed, the reclamation target is updated, and the cross-group synchronization cost of each host group (except for the removed host group) is once again computed (step 1006).

In a third step, beginning with the host having the least number of accelerators and a total number of accelerators which is less than the reclamation target, all accelerators are removed (reclaimed), the reclamation target is updated, and the method returns to the beginning of the third step by removing all accelerators in the host identified as having the next-least number of accelerators and total number of accelerators less than the reclamation target (step 1008).

Finally, in a fourth step, beginning with the host having the least number of accelerators, the reclamation target is removed from this identified host, and the optimized (ceiling) topology is computed with the reduced accelerator number (step 1010). The method 1000 ends (step 1012).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for accelerator allocation and reclamation for deep learning jobs in a computing cluster, by a processor, comprising:
    recording runtime metrics of each accelerator of a set of accelerators currently allocated to and currently performing a deep learning job including computing a gain of computational power by an additional allocation of new accelerators during the performance of the deep learning job and computing a cost representative of performance of transferring data among the new accelerators and the set of currently allocated accelerators during the performance of the deep learning job, wherein computing the cost of transferring data includes calculating a synchronization cost comprising a metric indicating a performance impact of synchronizing the deep learning job across each of the new accelerators and each accelerator among the set of currently allocated accelerators within each job iteration; and
    responsive to computing the gain of computational power and computing the cost representative of performance while performing the deep learning job, allocating one of the new accelerators to the deep learning job or reclaiming one of the set of currently allocated accelerators performing the deep learning job upon determining an optimal accelerator topology according to a comparison of the gain of computation power to the cost of transferring data.

2. The method of claim 1, wherein the set of currently allocated accelerators are selected from a pool of accelerators comprised within a plurality of cluster hosts of the computing cluster, and the allocating or reclaiming comprises assigning or releasing, respectively, individual accelerators from respective hosts of the plurality of cluster hosts.

3. The method of claim 1, wherein computing the gain of computational power includes computing a division of a duration of calculation of each accelerator among the set of currently allocated accelerators within each job iteration and a number of data batches calculated on each accelerator among the set of currently allocated accelerators within each job iteration.

4. The method of claim 1, wherein the optimal accelerator topology comprises an optimized topology of the set of currently allocated accelerators associated with a given cluster host within the computing cluster based on the gain of computational power being less than the synchronization cost.

5. The method of claim 1, further including, pursuant to allocating the one of the new accelerators to the deep learning job, performing:
    grouping the new accelerators according to cluster hosts, known host groups, and unknown host groups;
    computing the optimal accelerator topology of the new accelerators in order of the cluster hosts, the known host groups, and the unknown host groups; and
    assigning the one of the new accelerators for allocation to the deep learning job by accepting the one of the new accelerators from at least one of the cluster hosts, the known host groups, and the unknown host groups.

6. The method of claim 1, further including, pursuant to reclaiming the one of the set of currently allocated accelerators from the deep learning job, performing:
    grouping each one of the currently allocated accelerators according to cluster hosts and host groups; and
    computing a cross-group synchronization cost of each host group, and commencing reclamation of the one of the set of allocated accelerators within the cluster hosts within a host group having the highest cross-group synchronization cost.

7. A system for accelerator allocation and reclamation for deep learning jobs in a computing cluster, the system comprising:
    a set of accelerators;
    a memory device; and
    a processor executing instructions stored in the memory device, wherein the processor:
        records runtime metrics of each accelerator of the set of accelerators currently allocated to and currently performing a deep learning job including computing a gain of computational power by an additional allocation of new accelerators during the performance of the deep learning job and computing a cost representative of performance of transferring data among the new accelerators and the set of currently allocated accelerators during the performance of the deep learning job, wherein computing the cost of transferring data includes calculating a synchronization cost comprising a metric indicating a performance impact of synchronizing the deep learning job across each of the new accelerators and each accelerator among the set of currently allocated accelerators within each job iteration; and responsive to computing the gain of computational power and computing the cost representative of performance while performing the deep learning job, allocates one of the new accelerators to the deep learning job or reclaiming one of the set of currently allocated accelerators performing the deep learning job upon determining an optimal accelerator topology according to a comparison of the gain of computation power to the cost of transferring data.

8. The system of claim 7, wherein the set of currently allocated accelerators are selected from a pool of accelerators comprised within a plurality of cluster hosts of the computing cluster, and the allocating or reclaiming comprises assigning or releasing, respectively, individual accelerators from respective hosts of the plurality of cluster hosts.

9. The system of claim 7, wherein computing the gain of computational power includes computing a division of a duration of calculation of each accelerator among the set of currently allocated accelerators within each job iteration and a number of data batches calculated on each accelerator among the set of currently allocated accelerators within each job iteration.

10. The system of claim 7, wherein the optimal accelerator topology comprises an optimized topology of the set of currently allocated accelerators associated with a given cluster host within the computing cluster based on the gain of computational power being less than the synchronization cost.

11. The system of claim 7, wherein the processor, pursuant to allocating the one of the new accelerators to the deep learning job, performs:
grouping the new accelerators according to cluster hosts, known host groups, and unknown host groups;
computing the optimal accelerator topology of the new accelerators in order of the cluster hosts, the known host groups, and the unknown host groups; and
assigning the one of the new accelerators for allocation to the deep learning job by accepting the one of the new accelerators from at least one of the cluster hosts, the known host groups, and the unknown host groups.

12. The system of claim 7, wherein the processor, pursuant to reclaiming the one of the set of currently allocated accelerators from the deep learning job, performs:
grouping each one of the currently allocated accelerators according to cluster hosts and host groups; and
computing a cross-group synchronization cost of each host group, and commencing reclamation of the one of the set of allocated accelerators within the cluster hosts within a host group having the highest cross-group synchronization cost.

13. A computer program product for accelerator allocation and reclamation for deep learning jobs in a computing cluster, by a processor, the computer program product embodied on a non-transitory computer-readable storage medium having computer-readable program code portions stored therein, the computer-readable program code portions comprising:
an executable portion that records runtime metrics of each accelerator of a set of accelerators currently allocated to and currently performing a deep learning job including computing a gain of computational power by an additional allocation of new accelerators during the performance of the deep learning job and computing a cost representative of performance of transferring data among the new accelerators and the set of currently allocated accelerators during the performance of the deep learning job, wherein computing the cost of transferring data includes calculating a synchronization cost comprising a metric indicating a performance impact of synchronizing the deep learning job across each of the new accelerators and each accelerator among the set of currently allocated accelerators within each job iteration; and
an executable portion that, responsive to computing the gain of computational power and computing the cost representative of performance while performing the deep learning job, allocates one of the new accelerators to the deep learning job or reclaiming one of the set of currently allocated accelerators performing the deep learning job upon determining an optimal accelerator topology according to a comparison of the gain of computation power to the cost of transferring data.

14. The computer program product of claim 13, wherein the set of currently allocated accelerators are selected from a pool of accelerators comprised within a plurality of cluster hosts of the computing cluster, and the allocating or reclaiming comprises assigning or releasing, respectively, individual accelerators from respective hosts of the plurality of cluster hosts.

15. The computer program product of claim 13, wherein computing the gain of computational power includes computing a division of a duration of calculation of each accelerator among the set of currently allocated accelerators within each job iteration and a number of data batches calculated on each accelerator among the set of currently allocated accelerators within each job iteration.

16. The computer program product of claim 13, wherein the optimal accelerator topology comprises an optimized topology of the set of currently allocated accelerators associated with a given cluster host within the computing cluster based on the gain of computational power being less than the synchronization cost.

17. The computer program product of claim 13, further including an executable portion that, pursuant to allocating the one of the new accelerators to the deep learning job, performs:
grouping the new accelerators according to cluster hosts, known host groups, and unknown host groups;
computing the optimal accelerator topology of the new accelerators in order of the cluster hosts, the known host groups, and the unknown host groups; and
assigning the one of the new accelerators for allocation to the deep learning job by accepting the one of the new accelerators from at least one of the cluster hosts, the known host groups, and the unknown host groups.

18. The computer program product of claim 13, further including an executable portion that, pursuant to reclaiming the one of the set of currently allocated accelerators from the deep learning job, performs:
grouping each one of the currently allocated accelerators according to cluster hosts and host groups; and
computing a cross-group synchronization cost of each host group, and commencing reclamation of the one of the set of allocated accelerators within the cluster hosts within a host group having the highest cross-group synchronization cost.

* * * * *